United States Patent
Ibaiondo Madariaga et al.

(10) Patent No.: US 8,146,513 B2
(45) Date of Patent: Apr. 3, 2012

(54) DEVICE AND CONTROL PROCEDURE FOR RECOVERY OF KINETIC ENERGY IN RAILWAY SYSTEMS

(76) Inventors: Harkaitz Ibaiondo Madariaga, Zamudio (ES); Asier Romo Bergado, Zamudio (ES); Iker González Narvaiza, Zamudio (ES); Xabier Garin Ibarzabal, Zamudio (ES); Francisco Javier Olea Unamuno, Zamudio (ES)

( * ) Notice: Subject to any disclaimer, the term of this patent is extended or adjusted under 35 U.S.C. 154(b) by 406 days.

(21) Appl. No.: 12/556,732

(22) Filed: Sep. 10, 2009

(65) Prior Publication Data
US 2010/0063646 A1    Mar. 11, 2010

(30) Foreign Application Priority Data
Sep. 11, 2008 (ES) .................................. 200802589

(51) Int. Cl.
| | |
|---|---|
| *B60L 11/00* | (2006.01) |
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02P 3/14* | (2006.01) |
| *H02P 3/18* | (2006.01) |

(52) U.S. Cl. .................... 104/289; 700/286; 318/376
(58) Field of Classification Search .................. 700/286, 700/297, 298; 363/13, 15, 34; 318/362, 318/364, 370–372, 375, 376; 104/287–289
See application file for complete search history.

(56) References Cited

U.S. PATENT DOCUMENTS

| | | | | | |
|---|---|---|---|---|---|
| 3,774,095 | A | * | 11/1973 | Coccia | 318/371 |
| 3,850,390 | A | * | 11/1974 | Geiger | 246/128 |
| 3,929,307 | A | * | 12/1975 | Geiger | 246/130 |
| 6,370,039 | B1 | * | 4/2002 | Telefus | 363/15 |
| 6,897,576 | B2 | * | 5/2005 | Ishikawa et al. | 290/45 |
| 8,049,455 | B2 | * | 11/2011 | Kitanaka | 318/563 |
| 8,069,792 | B2 | * | 12/2011 | Shapery | 104/287 |
| 2005/0285554 | A1 | * | 12/2005 | King et al. | 318/376 |

FOREIGN PATENT DOCUMENTS

AT    314 946    4/1974
(Continued)

OTHER PUBLICATIONS

P. Randewijk et al., "Inverting DC Traction Substation with Active Power Filtering Incorporated," Department of Electrical and Electronic Engineering, University of Stellenbosch, Stellenbosch, RSA, 1995 IEEE.

(Continued)

*Primary Examiner* — Crystal J Barnes-Bullock
(74) *Attorney, Agent, or Firm* — Wenderoth, Lind & Ponack, L.L.P.

(57) ABSTRACT

The railway system has a DC voltage catenary (20) connected to a rectifier bridge block (40) that is in turn connected to a transformer (30) joined to a three-phase AC grid (10). The device (50) has a first DC/DC voltage raising block (51) connected between the catenary (20) and an intermediate bus that is connected to a second DC/AC three-phase current generation block (52) joined to the transformer (30). The first block (51) allows raising the DC voltage of the catenary (20) generating a controlled voltage with which the second block (52) generates a high-quality three-phase current that is delivered to the grid (10).

18 Claims, 14 Drawing Sheets

FOREIGN PATENT DOCUMENTS

| | | | |
|---|---|---|---|
| DE | 3527309 A1 | * | 2/1987 |
| EP | 122462 A1 | * | 10/1984 |
| JP | 56-132101 | | 10/1981 |
| JP | 62-37241 | | 3/1987 |
| JP | 63-121540 | | 8/1988 |
| JP | 4-138002 | | 5/1992 |
| JP | 11-286229 | | 10/1999 |
| KR | 10-2005-0011818 | | 1/2005 |

OTHER PUBLICATIONS

A. Horn et al., "Evaluation of Converter Topologies for Improved Power Quality in DC Traction Substations," Department of Electrical and Electronic Engineering, University of Stellenbosch, Stellenbosch, South Africa, 1996 IEEE.

R. Wilkinson et al., "Control Options for a Bi-Directional Multilevel Traction Chopper," Department of Electrical and Electronic Engineering, University of Stellenbosch, Stellenbosch, South Africa, 1996 IEEE.

R. Wilkinson et al., "DC-Side Harmonic Compensation in DC Traction Applications," Department of Electrical and Electronic Engineering, University of Stellenbosch, South Africa, 1996 IEEE.

P. H. Henning et al., "Development of a 1.5 MW, Seven Level Series-stacked Converter as an APF and Regeneration Converter for a DC Traction Substation," Department of Electrical and Electronic Engineering, University of Stellenbosch, Stellenbosch, South Africa, 2005 IEEE.

P. Henning, "Thesis: Control of a 1.5 MW active power filter and regeneration converter for a Spoornet DC traction substation," Department of Electrical and Electronic Engineering, University of Stellenbosch, Apr. 2005.

S. Song et al., "Regeneration inverter system for DC traction with harmonic reduction capability," Dep. Information & Communication Department eng., Sungkyunkwan University, Korea, 2004 IEEE.

C. Bae et al., "Simulation Study of Regenerative Inverter for DC Traction Substation," Korea Railroad Research Institute, Uiwang, Korea, 2005 IEEE.

S. Jang et al., "Study of Regeneration Power Control Inverter for DC Traction with Active Power Filter Ability," 2005 IEEE.

Conferencia UIC "Energy Efficiency Days": Reversible DC substation, Sep. 2009.

* cited by examiner

State of the art

State of the art

State of the art

US 8,146,513 B2

DEVICE AND CONTROL PROCEDURE FOR RECOVERY OF KINETIC ENERGY IN RAILWAY SYSTEMS

OBJECT OF THE INVENTION

The present invention, as stated in the title of this descriptive memory, relates to a device and control procedure for recovery of kinetic energy in railway systems, the object of which is to optimize the energy recovery made possible in train braking, allowing to inject in the corresponding electric grid a high-quality three-phase current, even in high grid voltage situations and using the pre-existing transformer in the substation supply connection. The invention produces the regeneration of energy in traction systems during the braking processes of trains associated to a DC catenary so that, with the device of the invention, when the voltage read in the catenary is greater than a specified value, energy is extracted to inject it in the corresponding alternating current grid. This is done overcoming drawbacks of the state of the art such as the low efficiency with respect to the total available energy that could be injected in the grid and the voltage fluctuations produced in other systems.

BACKGROUND OF THE INVENTION

Railway systems are known having a direct current catenary connected to a block of rectifier bridges that is in turn connected to the secondary winding of a transformer placed at the connection to the corresponding substation, the primary winding of which being connected to a three-phase alternating current grid, connecting an energy harnessing device between the catenary and the secondary winding of the transformer, so that during braking of the trains a certain voltage is supplied to the grid to allow making use of this energy.

FIG. 12, corresponding to the state of the art, shows an arrangement existing in railway substations with DC catenary in which the catenary 20 is fed through uncontrolled rectifier bridges 40 that do not allow energy flow from said catenary 20 to the AC grid 10, so that the railway unit or train, when braking, limits the voltage in the catenary 20 and the excess energy is burnt in a system installed for this purpose in the railway unit itself.

Improving on the situation described in the preceding paragraph, solutions have been proposed such as that shown in FIG. 13, also corresponding to the state of the art, allowing to recover energy by means of a device 60a, which however has drawbacks in that it can only recover energy when the voltage in the catenary 20 is high enough for the corresponding inverter circuit to regulate the current delivered to the grid 10. This solution, shown in FIG. 12, is not satisfactory because not all the energy available is used in the catenary 20 and because the quality of the current delivered to the grid 10 can be reduced by a lack of sufficient voltage.

Another solution of the state of the art is shown in FIG. 14, where the corresponding device 60b uses an independent transformer 70 to raise the voltage. In this case drawbacks appear related to the fact that the inversion and the installation volume are greater, and even so the system is subject to voltage fluctuations in the grid 10, without the working voltage being sufficient to optimize the quality of the current delivered.

DESCRIPTION OF THE INVENTION

To achieve the objectives and avoid the drawbacks indicated above, the invention consists of a device and control procedure for recovery of kinetic energy in railway systems in which the railway system comprises a DC catenary connected to a block of rectifier bridges which in turn is connected to the secondary winding of a transformer, present in the supply connection of the corresponding substation, the primary winding of the transformer being connected to a three-phase AC grid, connecting the device between the catenary and the secondary winding of the transformer.

Innovatively, according to the invention, the device thereof comprises a first block for raising the DC/DC voltage, which isolates harmonics and fluctuations of the catenary, connected between the catenary and an intermediate bus provided with a capacitor that in turn is connected to a second block for generating DC/AC three-phase current joined to the secondary winding of the transformer, such that when the corresponding train brakes, the aforementioned first block allows raising the DC voltage of the catenary to generate a controlled voltage in the intermediate bus, while the aforementioned second block, with this controlled voltage, allows generating a high-quality three-phase current that is delivered to the three-phase grid through the transformer.

According to the preferred embodiments of the invention, the device thereof is undersized in power and energy capacity with respect to the pre-existing power supply system based on the rectifier bridges, so that the transformer can withstand the resulting energy flow.

In a preferred embodiment of the invention for the aforementioned first block, this block is formed by at least one branch with at least three semi-conducting switches of which at least the middle switch can be controlled in startup and shutdown, while the mid point defined between the upper and the middle semi-conducting switches is connected through a coil to the positive terminal of the catenary, and the mid point formed between the lower and the middle semi-conducting switches is connected through a coil to the ground or negative terminal of the catenary.

For this embodiment and in the aforementioned branch, the upper and lower semi-conducting switches are current-unidirectional switches of the diode type, while the middle switch is a current-bidirectional switch of the IGBT type.

In a second embodiment of the aforementioned first block, it is formed by two branches with at least two semi-conducting switches in each one, so that the mid point of one of the branches is connected through a coil to the positive terminal of the catenary and the mid point of the other branch is connected through another coil to the ground or negative terminal of the catenary.

In one embodiment of these two branches the upper semi-conducting switch of the branch associated to the positive terminal of the catenary and the lower semi-conducting switch of the branch associated to the negative terminal of the catenary are current-unidirectional switches of the diode type, while the other two semi-conducting switches are current-bidirectional switches of the IGBT type.

In another embodiment of these two branches the aforementioned semi-conducting switches of each of the two branches are current-bidirectional switches of the IGBT type.

In a third embodiment of the aforementioned first block of the device, this first block is formed by at least one branch with at least four semi-conducting switches wherein at least the two middle switches can be controlled in startup and shutdown, and the mid point formed between the two upper semi-conducting switches is connected through a coil to the negative terminal of the catenary.

In this third embodiment of the first block, both the upper and lower semi-conducting switches of the said branch can be current-unidirectional switches of the diode type and both middle semi-conducting switches can be current-bidirectional switches of the IGBT type, in addition providing that in the said third embodiment of the first block the four semi-conducting switches in the aforementioned branch are current bidirectional switches of the IGBT type.

In a first embodiment of the said second block of the device of the invention, this second block is formed by three branches with at least two current-bidirectional semi-conducting switches in each branch, so that each branch corresponds to one phase of the three-phase voltage system of the three-phase grid and optionally includes an inductance connected between the mid point of the branch and the corresponding phase of the transformer; it is possible to do without said inductances if the corresponding leak inductance of the transformer is enough to ensure current regulation.

In a second embodiment of said second block of the device, conceived for high-voltage applications, a three-level NPC circuit is used with current-unidirectional semi-conducting switches of the diode type joined to a mid point of the intermediate bus, which limit the voltage supported by other semi-conducting switches of the IGBT type, in this case the intermediate bus having two capacitors between which the aforementioned mid point is established.

On another hand, for power expansions with high currents, the device of the invention can have a first block in charge of regulating the voltage of the intermediate bus sized with the number of branches needed to work with the corresponding current, while one or more of the second block are placed in parallel after the single intermediate DC bus provided with a single capacitor.

In addition, according to another embodiment of the invention, between the catenary and the DC/DC voltage raising block it is possible to connect an additional, optional block formed by a diode with its anode connected to the positive terminal of the catenary and its cathode connected to the positive terminal of the DC/DC voltage raising block, and by a capacitor connected between the cathode of said diode and the ground or negative terminal of the catenary, with the function of supplying harmonics of the current used by the DC/DC voltage raising block so that they are not consumed from the catenary and the catenary is not perturbed, said capacitor being uncoupled from the perturbations present in the catenary by the presence of the this diode.

According to the control procedure of the present invention, which uses the device that has been described, for regulating the power and quality of the current delivered to the alternating current grid, the action is presented of two coupled regulators, one of which regulates the voltage of the intermediate bus to a specific value, controlling the current through the DC/DC voltage raising block, the intermediate bus being uncoupled from the variations and perturbations present in the catenary, while the other regulator regulates the power delivered by the three-phase DC/AC current generation block to the grid, determined according to the voltage measured in the catenary provided it passes a certain threshold, optimizing the dynamics of the system with a feedforward signal by which the second regulator sends to the first the value of the power it supplies to the grid.

In addition, the control procedure described includes a regulation by means of a control associated to the DC/DC voltage raising block of a voltage of the intermediate bus higher than the catenary voltage, allowing to recover energy in situations of high grid voltage close to the catenary voltage, thereby optimizing the total energy recovered.

According to the control procedure described, this procedure minimizes the harmonic component of the current delivered by the three-phase DC/AC current generation block, determining the optimum value of the intermediate bus voltage for each grid voltage value.

According to the control procedure of the invention, the current circulating in the rectifier bridge block during the regeneration process is monitored and the value of the threshold voltage to be regulated in the catenary is adjusted so that the value of the re-circulating current between the rectifier bridge block and the device of the invention is minimum or zero.

With the described structure, the device of the invention has advantages such as that the initial diode-based system for feeding the catenary remains unchanged, and the device of the invention facilitates a system for energy recovery that is transparent to its operation, so that in case of malfunction the device of the invention is disconnected and the substation remains operative. In addition, in the device of the invention the preliminary DC/DC conversion step isolates the intermediate bus capacitor from the fluctuations and harmonics present in the catenary, so that the generation of the three-phase current is performed from a stabilized bus voltage and the useful lifetime of the bus capacitor is not reduced due to harmonics present in the catenary. Moreover, in case of short-circuit in the catenary the device of the invention is not affected and this short-circuit does not supply energy, as the intermediate bus remains isolated from the catenary.

In the device of the invention the control strategy is based on measuring and regulating the catenary voltage. In the braking process, trains raise the catenary voltage to deliver energy to it. The control of the device attempts to limit the maximum voltage in the catenary by extracting current from it.

The energy regeneration device of the invention monitors at all times the voltage in the catenary. When the measured voltage exceeds a desired threshold value, energy is extracted from the catenary, trying to keep the voltage in it under the desired threshold value.

The maximum power extracted from the catenary is limited by the maximum power for which the device has been designed.

The device of the invention can also fulfil other functions. Thus, in the AC side the device of the invention can operate as an active filter and improve the wave quality of the current consumed by the diode bridge, or compensate the reactive power to obtain a cos(phi) value approaching 1.

In addition, if the said first block of the device of the invention is current bidirectional, the entire device can be used during train accelerations to supply energy to the catenary 20, consuming high-quality current from the alternating current grid. The said first block or chopper circuit of the device of the invention can also be used to compensate harmonics in the catenary.

To aid a better understanding of this description, a set of figures are accompanied forming an integral part of the description where for purposes of illustration only and in a non-limiting sense the object of the invention is represented.

DESCRIPTION OF ONE OR SEVERAL EXAMPLES OF EMBODIMENTS OF THE INVENTION

A description is given below of several examples of the invention with reference to the numbering used in the figures.

Figure 1:
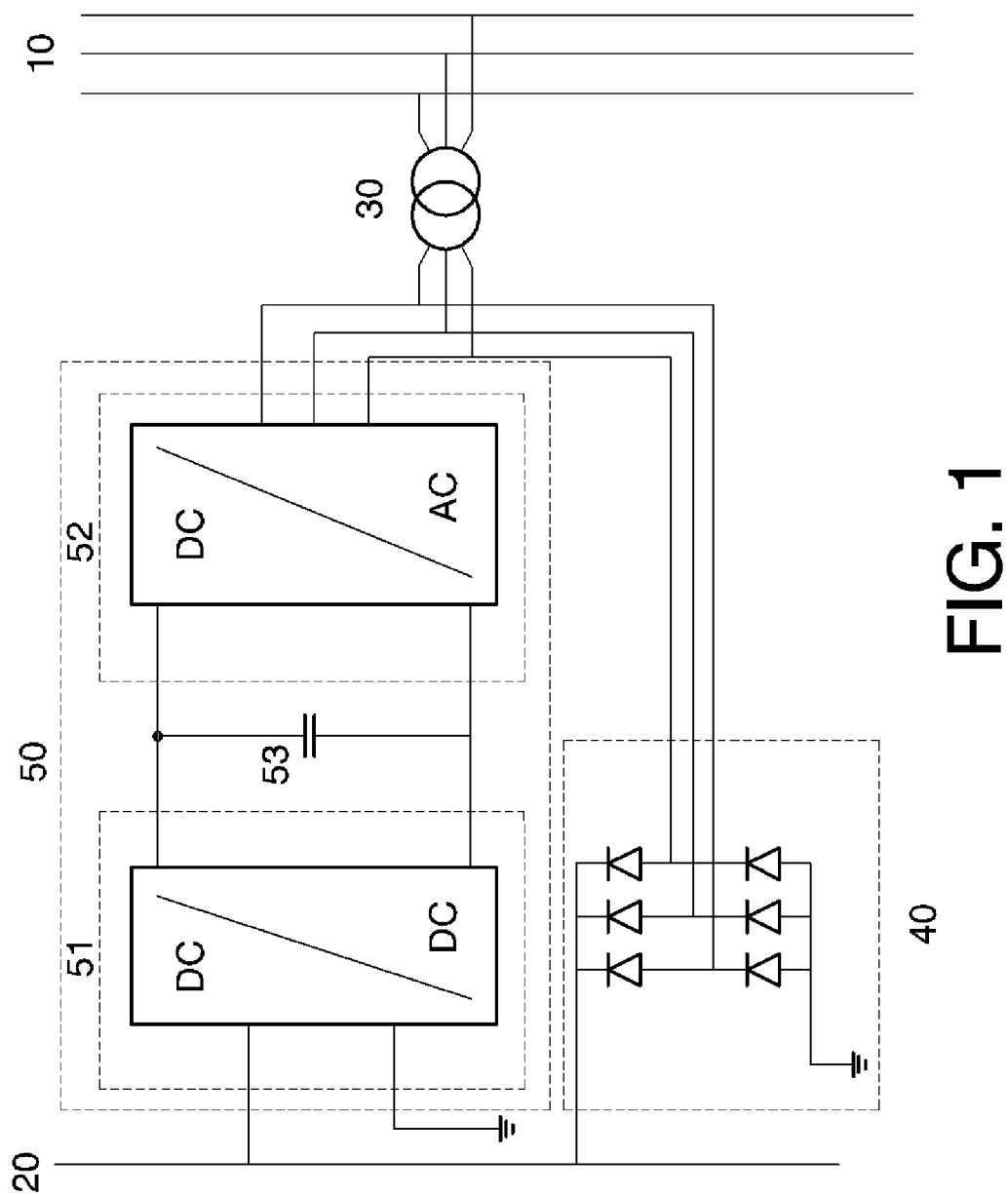
FIG. 1. Shows a schematic representation of a functional block diagram of a device for recovery of kinetic energy in railway systems executed according to the present invention.

Thus, FIG. 1 shows the general scheme or functional blocks diagram of the main embodiment of the invention, wherein its device labeled 50 is connected between a DC catenary 20 and the secondary winding of a transformer 30 previously existing in the corresponding substation and connected to a three-phase AC distribution grid 10. In addition, there is a rectifier bridge block 40 connected between the catenary 20 and the secondary winding of the transformer 30. The device of the invention 50 is formed by a second block 52 that is able to generate three-phase alternating current from the direct current of an intermediate bus with a capacitor 53 that is regulated by a first block 51 of the device and which is provided with semi-conducting switches to exchange energy between two direct current sources. Thus, the block 51 is a block for raising DC/DC current while the second block 52 is a block for generating three-phase DC/AC current.

In all the embodiments shown in this section, the device 50 is undersized in power and energy capacity with respect to the pre-existing catenary power supply system 20 based on the rectifier bridges 40, so that the transformer 30 can withstand the resulting energy flow.

The configuration of elements 51, 52 and 53 of the above-mentioned device 50 is such that when a train brakes, the first block 51 will raise the DC voltage of the catenary 20, generating a controlled voltage in the intermediate bus or terminals of the capacitor 53, while the second block 52, with this controlled voltage, generates a high-quality three-phase current that is supplied to the three-phase grid 10 through the transformer 30.

FIGS. 2 to 6 show several circuits of preferred embodiments of the part of the device 50 referred to as the first block 51 for raising the voltage.

Figure 2:
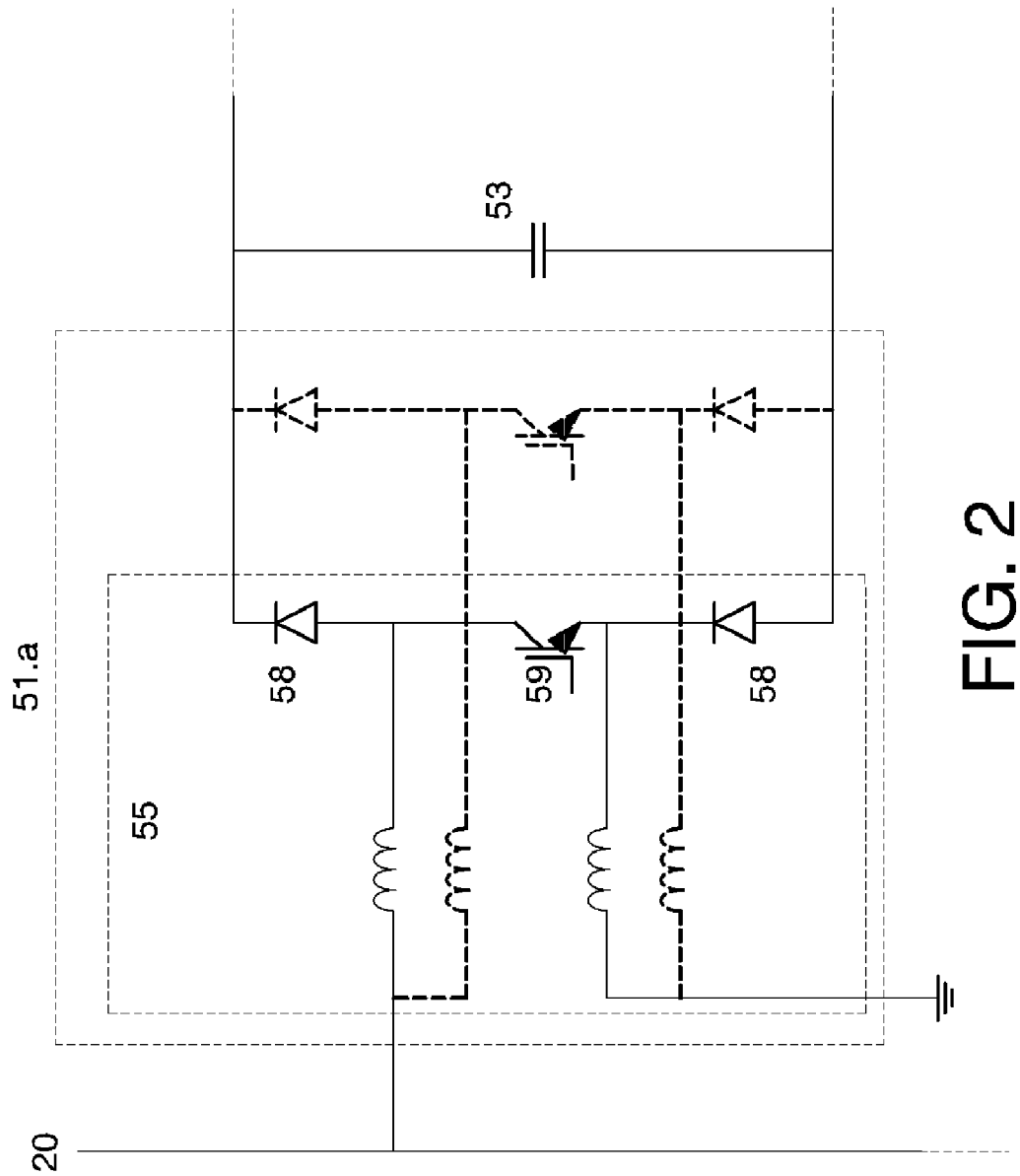
FIG. 2. Shows a schematic representation of a first embodiment of a block included in the above-described FIG. 1.

Thus, in FIG. 2 this first block labeled 51a is formed by at least one branch 55 with at least three semi-conducting switches, wherein at least the middle switch can be controlled in startup and shutdown, in which the mid point defined between the upper and middle semi-conducting switches is connected through a coil to the positive terminal of the catenary 20; and the mid point defined between the lower and middle semi-conducting switches is connected through a coil to the ground or negative terminal of the catenary 20. The upper and lower semi-conducting switches of said branch 55 are current unidirectional switches of the diode type, being labeled with the number 58, while the middle switch is a current bidirectional switch of the IGBT type, being labeled with the number 59 as shown in the above-described FIG. 2.

Figure 3:
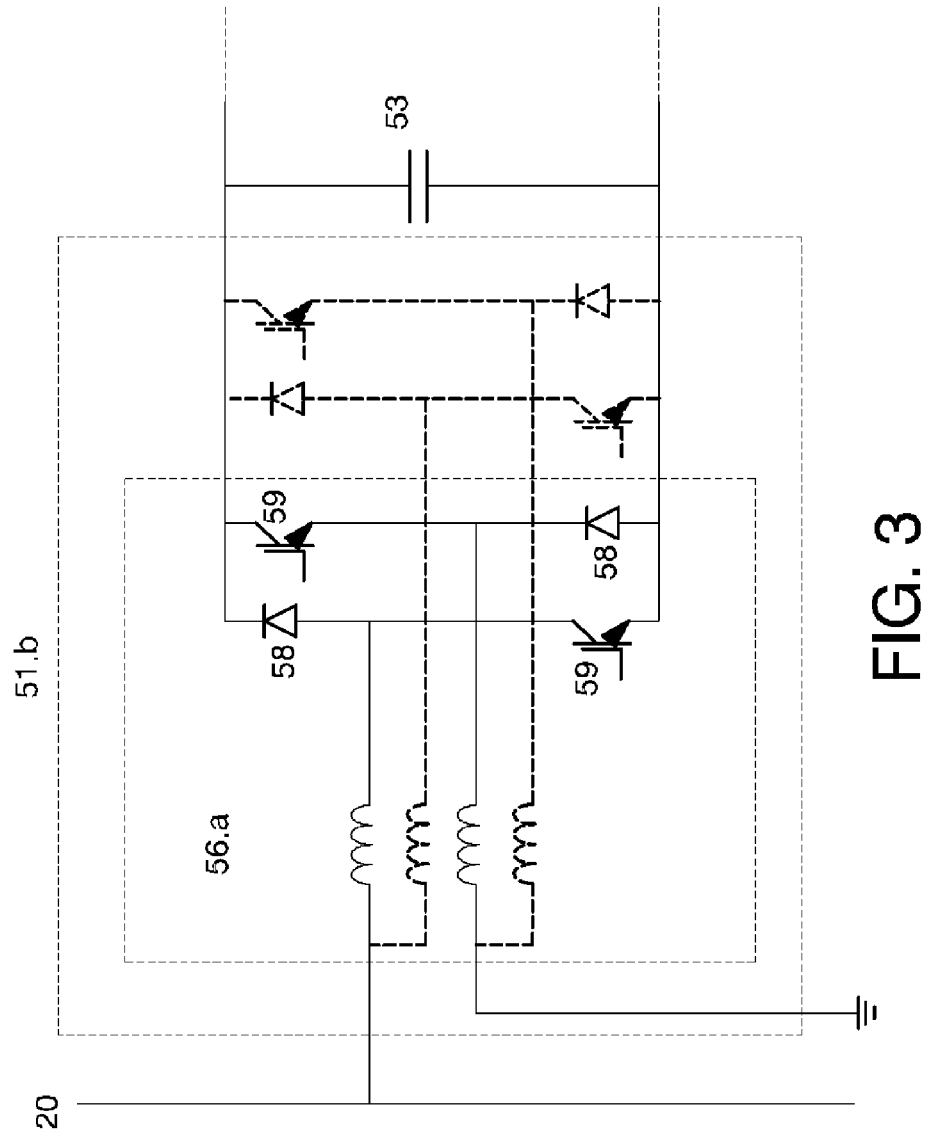
FIG. 3. Shows a schematic representation of a second embodiment of the first block referred to in the above-described FIG. 2.
Figure 4:
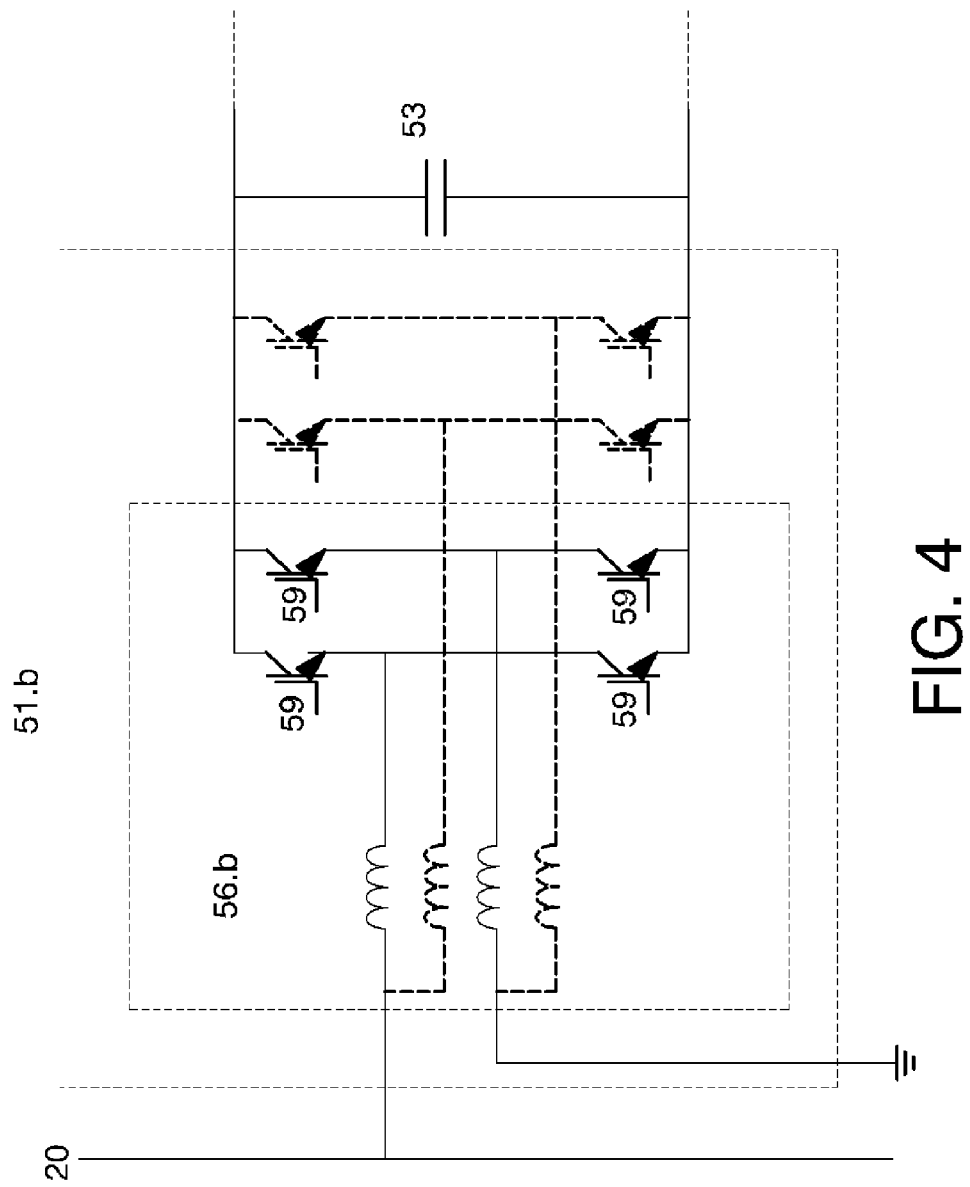
FIG. 4. Shows a variant of the second embodiment referred to in the above-described FIG. 3.

On another hand, in FIGS. 3 and 4 the said first block of the device 50 is labeled 51b and shows a second embodiment of the first block in which there are two branches, 56a in FIGS. 3 and 56b in FIG. 4. These two branches 56a or 56b each have at least two semi-conducting switches, so that the mid point of one of the branches is connected through a coil to the positive terminal of the catenary 20 and the mid point of the other branch is connected through another coil to the ground or negative terminal of the catenary 20.

In FIG. 3 the two branches 56a the upper semi-conducting switch of the branch associated to the positive terminal of the catenary and the lower semi-conducting switch of the branch associated to the negative terminal are current unidirectional switches of the diode type 58, while the other two semi-conducting switches are current bidirectional switches of the IGBT type 59.

In the variant of the second embodiment of the first block of the device 50, shown in FIG. 4, in the two branches 56b the semi-conducting switches of each branch are current bidirectional switches of the IGBT type 59, as shown in FIG. 4.

Figure 5:
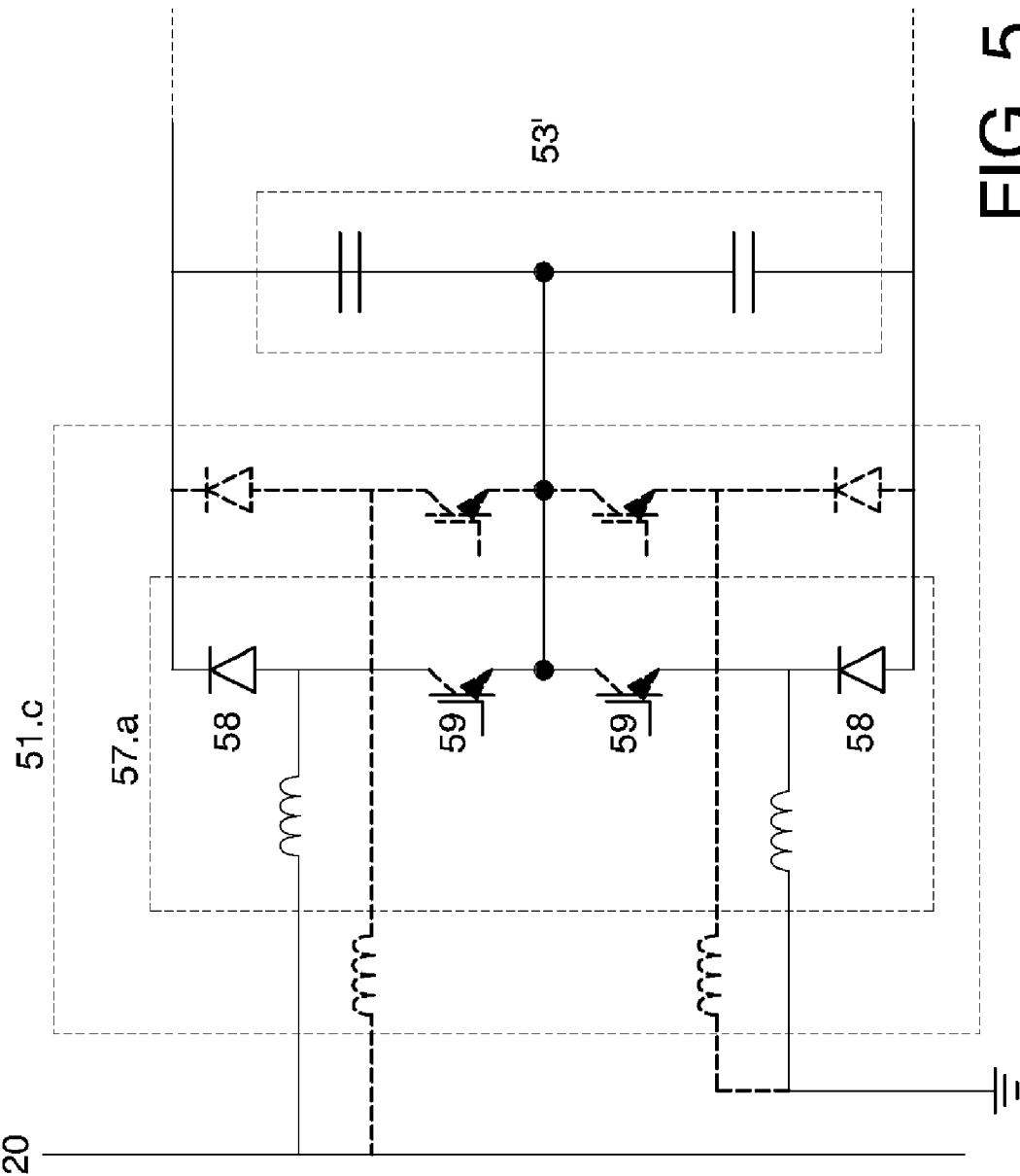
FIG. 5. Shows a schematic representation of the circuit of a third embodiment of the aforementioned first block of the above-described FIG. 1.
Figure 6:
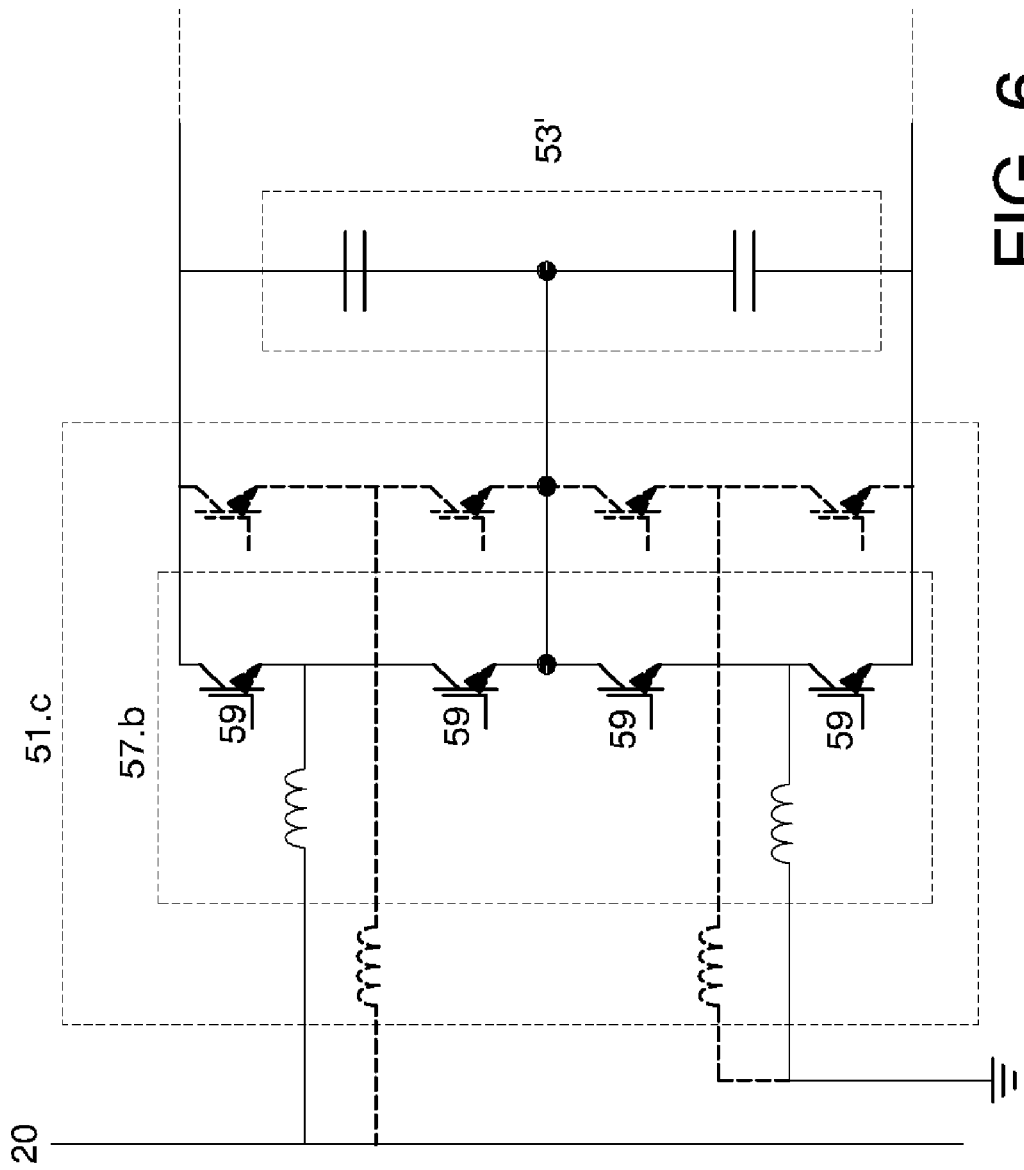
FIG. 6. Shows a variant of the third embodiment referred to in FIG. 5.

FIGS. 5 and 6 show a third embodiment for the first block of the device 50 that is specifically designed for applications at a higher voltage, labeled 51c. Thus, in FIG. 5 the first block 51c is formed by at least one branch 57a with at least four semi-conducting switches, wherein at least the two middle switches can be controlled in startup and shutdown; and the mid point defined between the two upper semi-conducting switches is connected through a coil to the positive terminal of the catenary, while the mid point defined between the two lower semi-conducting switches is connected through a coil to the negative terminal of the catenary. In said branch 57a the upper and lower semi-conducting switches of the branch are both current unidirectional switches of the diode type 58 and the two middle semi-conducting switches are current bidirectional switches of the IGBT type 59.

The configuration of FIG. 6 is analogous to the previous FIG. 5, except that in the corresponding branch 57b of the block 51c the four semi-conducting switches are current bidirectional switches of the IGBT type 59.

In this third embodiment of the first block 51c, as can be seen in FIGS. 5 and 6, the capacitor 53 of the device is replaced by a capacitor block 53' having two capacitors with connection points to the first block at its ends and between said capacitors.

In the explained FIGS. 2 to 6, the discontinuous lines show the possibility of increasing the current capacity and thereby the power capacity of the device 50, thereby showing that it is possible to connect in parallel the branches or units required for each specific application case according to the currents that will be used.

Figure 7:
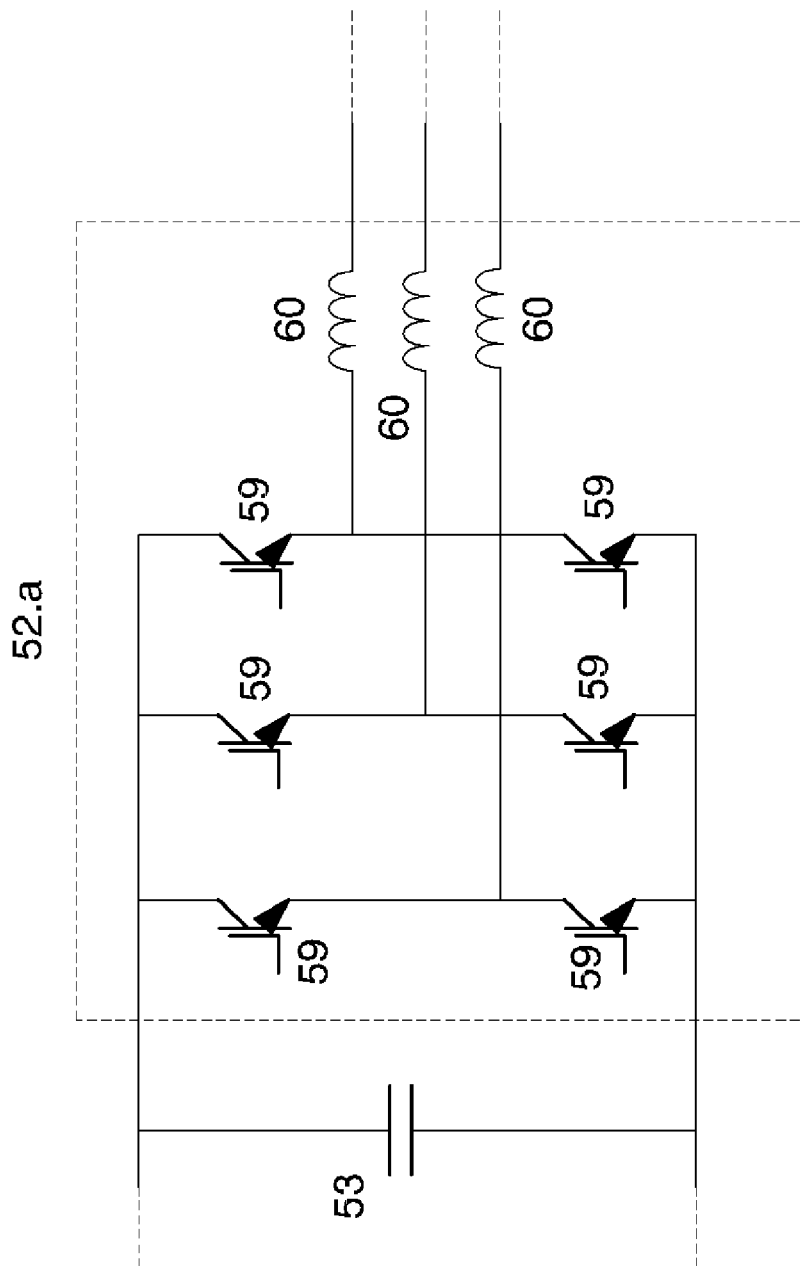
FIG. 7. Shows a schematic representation of the circuit of a first embodiment of a second block included in the above-described FIG. 1.

FIG. 7 shows a first embodiment for the second block of the device 50, labeled 52a, which shows a circuit formed by three branches with at least two current bidirectional semi-conducting switches 59 in each branch; such that each branch corresponds to one phase of the three-phase voltage system of the three-phase grid 10 and optionally presents an inductance 60 for each branch connected between the mid point of the corresponding branch and the corresponding phase of the transformer 30; these inductances 60 can be discarded in the case that the corresponding leak inductance of the transformer 30 is enough to ensure current regulation.

Figure 8:
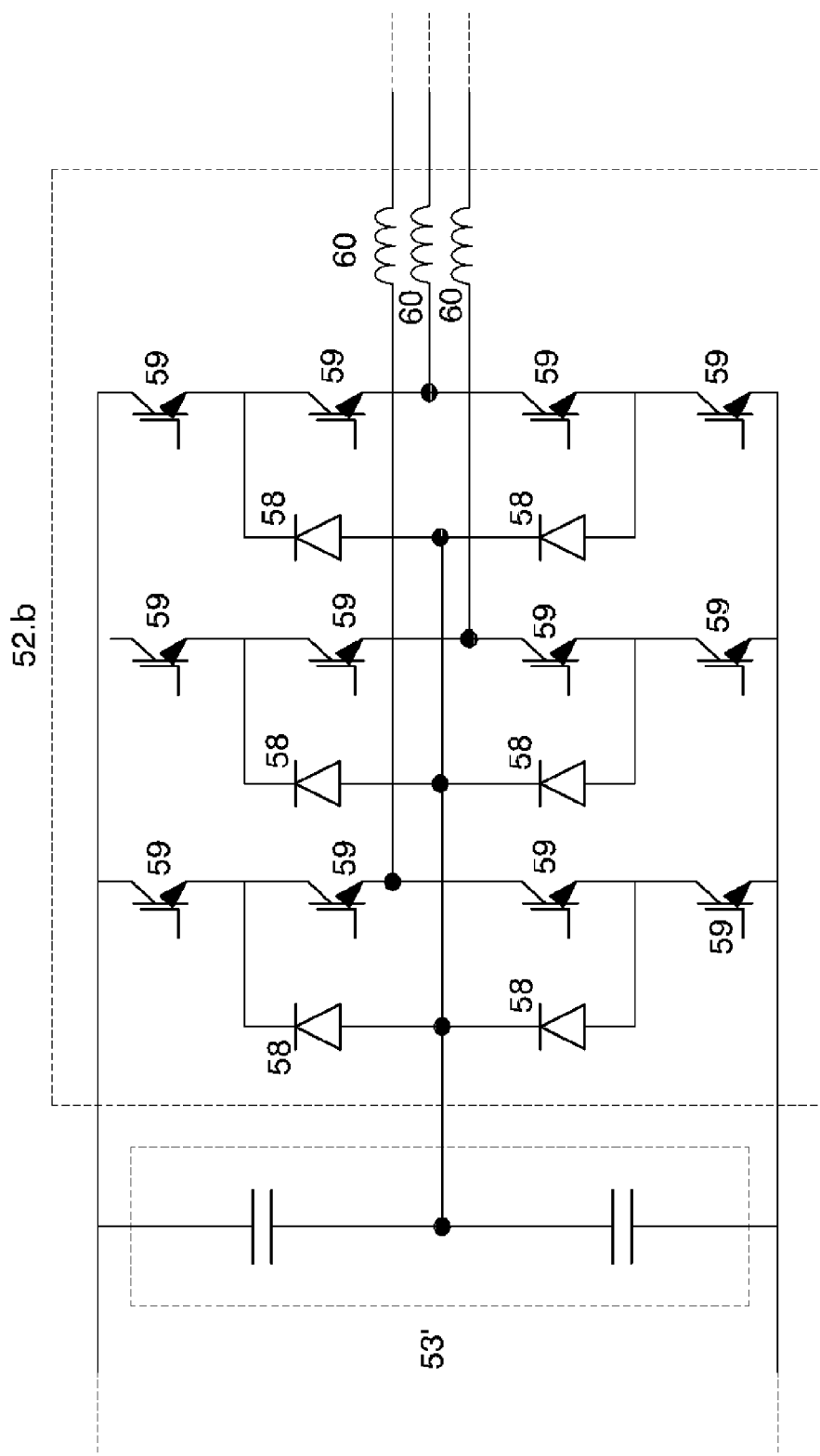
FIG. 8. Shows the circuit of a second embodiment of the aforementioned second block referred to in the above-described FIG. 7.

FIG. 8 shows a second embodiment of the second block of the device 50 for high voltage applications labeled 52b, constituting a three-level NPC circuit with current-unidirectional, diode type semi-conducting switches 58 joined to a mid point of the intermediate bus, which limit the voltage supported by other IGBT type semi-conducting switches 59, in this case the intermediate bus having two capacitors 53' between which is established the aforementioned mid point, as can be seen in FIG. 8.

Figure 9:
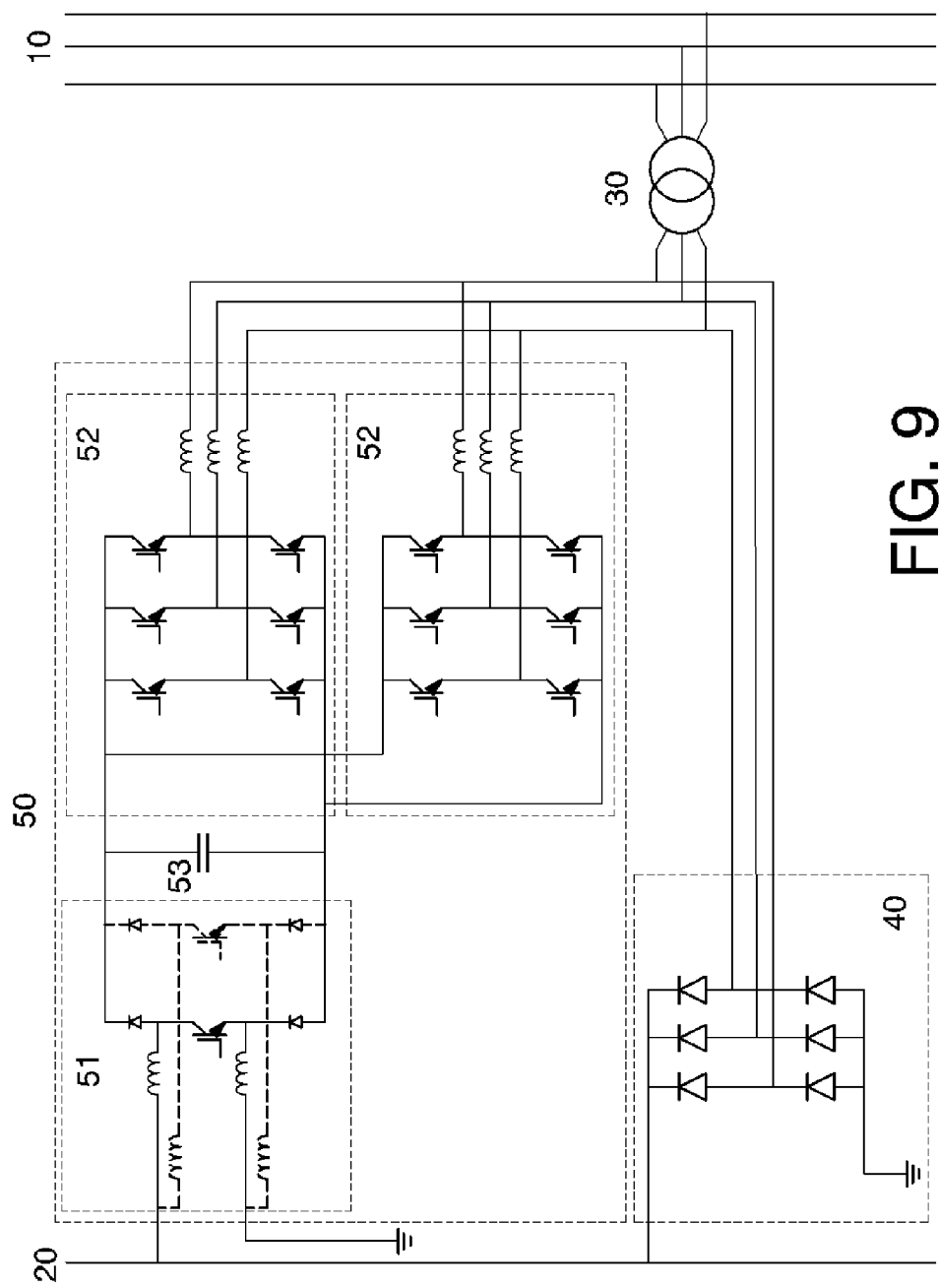
FIG. 9. Shows a functional block diagram of a device for kinetic energy recovery in railway systems analogous to that of the above-described FIG. 1, in this case according to a second embodiment of the invention.

FIG. 9 represents a second embodiment of the general scheme of the device 50, showing the possibility of power expansions with high currents, for which the aforementioned first block 51 is in charge of regulating the voltage of the intermediate bus and is dimensioned with the necessary number of branches to allow working with the corresponding current, while one or several of those of the aforementioned second block 52 are placed in parallel after this single dc intermediate bus provided with a single capacitor 53, as shown in FIG. 9. It must be noted that in this FIG. 9 the topology of the block 51 could be any of those shown in FIGS. 2 to 6, while the topology of the blocks 52 could be any of those shown in FIGS. 7 and 8.

Figure 10:
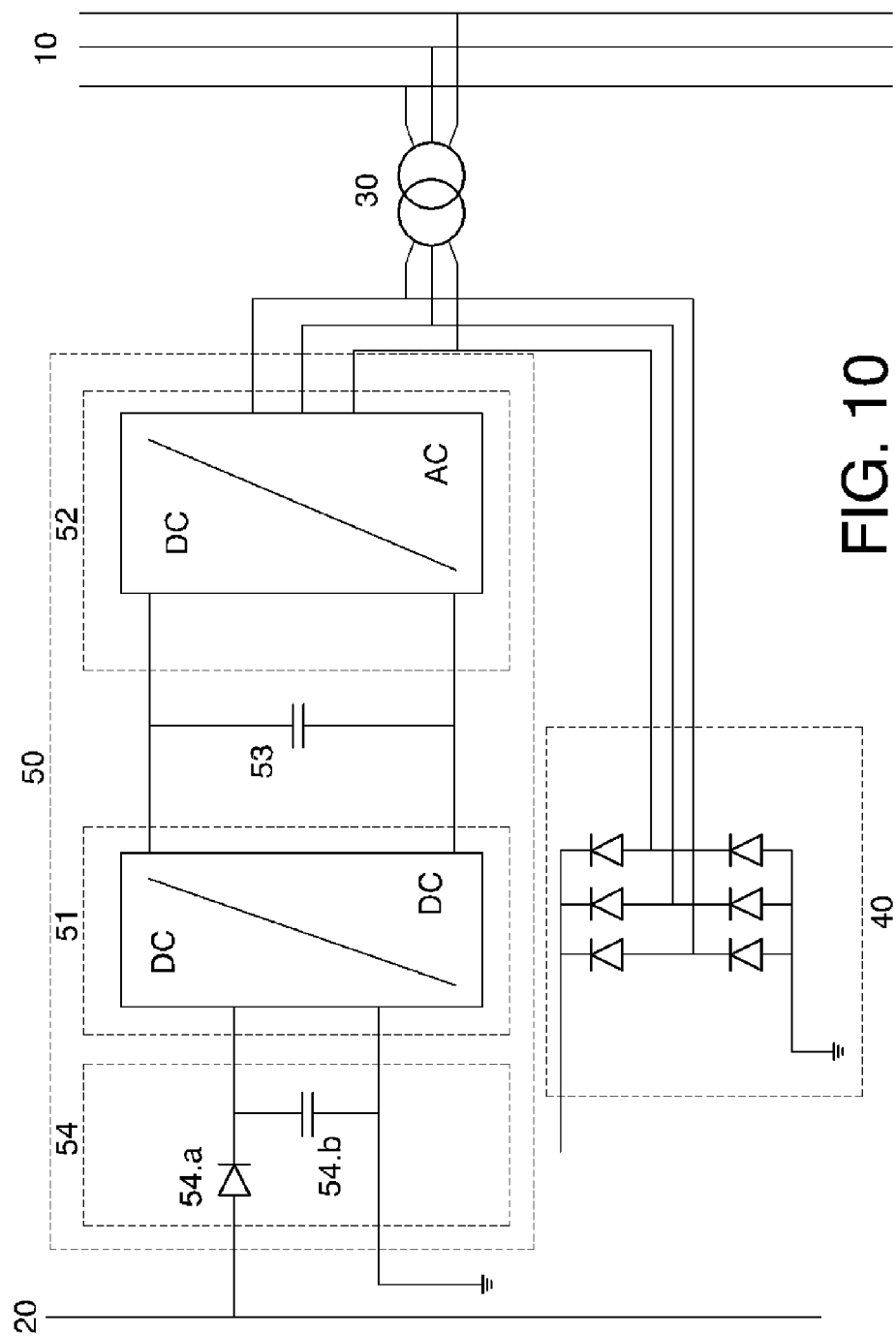
FIG. 10. Shows a functional block diagram of a device for kinetic energy recovery in railway systems analogous to that of the above-described FIGS. 1 and 9, in this case according to a third embodiment of the invention.

FIG. 10 shows a third embodiment of the invention that presents the option of interposing an additional optional block 54 between the catenary 20 and the DC/DC voltage raising block 51, as represented in this FIG. 10.

This additional optional block 54 has a diode 54.a with its anode connected to the positive terminal of the catenary 20 and its cathode connected to the positive terminal of the DC/DC voltage raising block 51, as well as a capacitor 54.b connected between the cathode of said diode and the ground or negative terminal of the catenary 20, as represented in FIG. 10.

The function of the capacitor 54.b is to supply the harmonics of the current consumed by the voltage raising block 51, so that they are not consumed from the catenary 30 and the catenary is not perturbed. On another hand, the diode 54.a uncouples the voltage of the capacitor from the perturbations present in the catenary 20 in periods in which the assembly of the invention or device 50 is not recovering energy. In addition, in case of short-circuit in the grid, the diode 54.a prevents the capacitor 54.b from discharging, so that the unit is not affected by the short-circuit.

To regulate the power and quality of the current delivered to the AC grid 10 a control procedure is followed making use of the device described, with the action of two coupled regulators, one of which regulates the voltage of the intermediate bus of the capacitor 53 to a specific value, controlling the current through the voltage raising block 51, this intermediate bus being uncoupled from the variations and perturbations present in the catenary 20, while the other regulator regulates the power delivered by the three-phase current generation block 52 to the grid 10 based on the voltage measured in the catenary 20, provided it exceeds a predefined threshold, optimizing the system's dynamics with a feedforward signal in which the second regulator sends to the first one the value of the power it delivers to the grid 10. This is a control strategy with two parallel controls: one associated to the voltage raising block 51 for controlling the voltage of the intermediate bus, and another associated to the three-phase current generation block 52 for controlling the voltage in the catenary 20 so that it does not exceed a specified threshold, calculating the power that must be extracted from the catenary 20. To speed up the control dynamics, the control associated to the block 52 sends the value of the extracted power to the other control.

In addition, in the above-mentioned control procedure there is a regulation performed by a control associated to the voltage raising block 51 of a voltage of the intermediate bus of the capacitor 53, greater than the voltage of the catenary 20, allowing to recover energy in case of high voltages of the grid 10 approaching the catenary voltage 20, thereby optimizing the total energy recovered. This allows working in high grid voltage situations.

Moreover, according to the control procedure of the invention a minimization is carried out of the harmonic component of the current delivered by the three-phase current generation block 52, thereby determining the voltage value of the intermediate bus of the capacitor 53 that is optimum for each value of the voltage of the grid 10. Thus, the voltage in the intermediate bus is always adjusted to the voltage existing in the grid, as the latter can fluctuate by ±10%, so that the resulting harmonic component in the current delivered is always a minimum.

On another hand, according to the control procedure of the invention the current circulating in the rectifier bridge block 40 during the regeneration process is monitored and the threshold value to regulate in the catenary 20 is adjusted so that the value of the current re-circulating between the rectifier bridge block 40 and the device 50 is minimal or zero. This prevents overheating of the equipment and prevents worsening the quality of the current delivered. During the periods in which the three-phase current generation block is operating, the current passing through the rectifier bridge block is read and, to make this current very small or zero, the approach used is to increase the catenary voltage threshold value that the control associated to this three-phase current generation block attempts to control. In this way, the aforementioned current is cancelled, obtaining the optimum value of total recovered energy.

Figure 11:
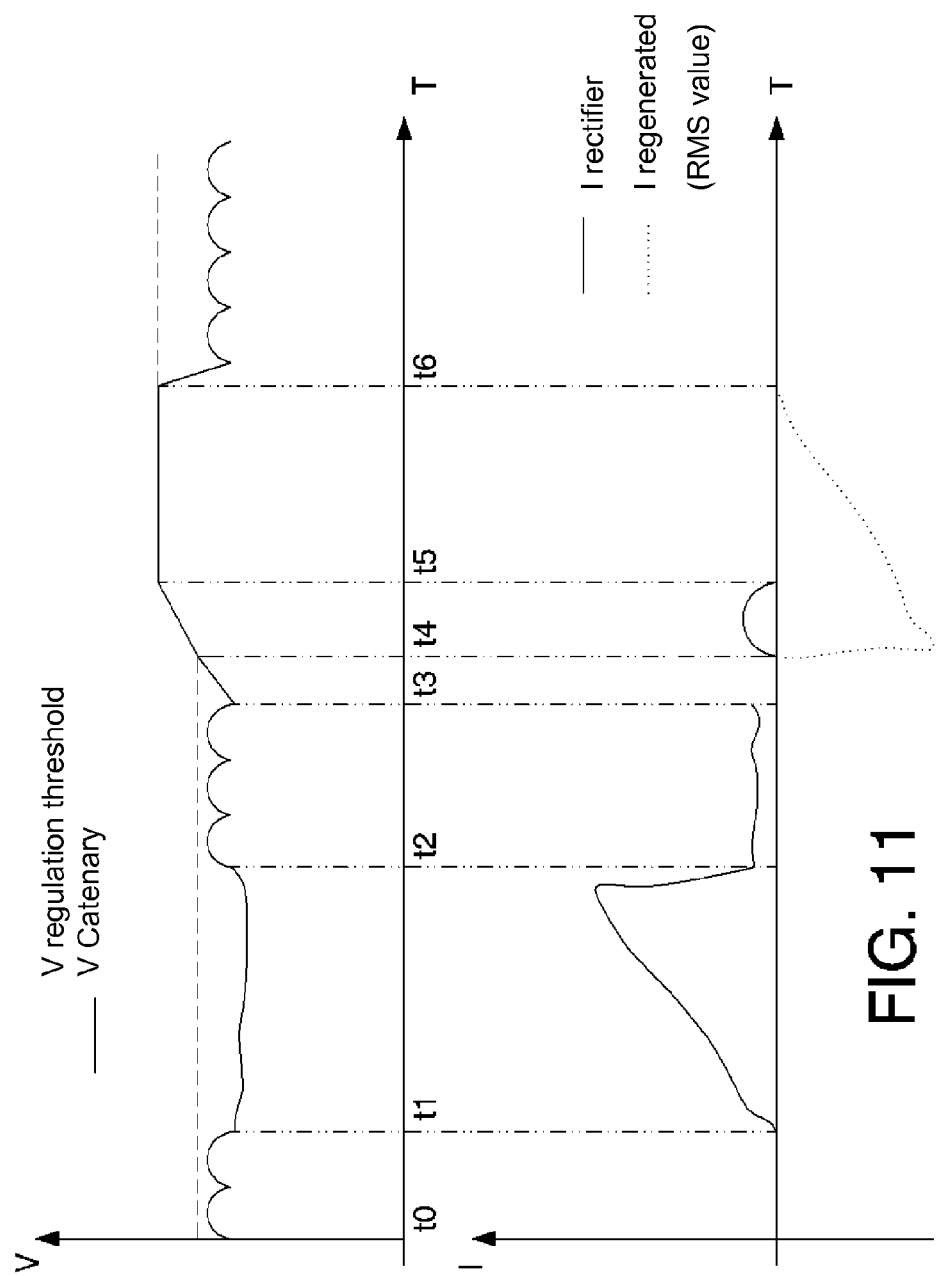
FIG. 11. Shows a current and voltage diagram facilitated with the block diagram of the above-described FIG. 1.
Figure 12:
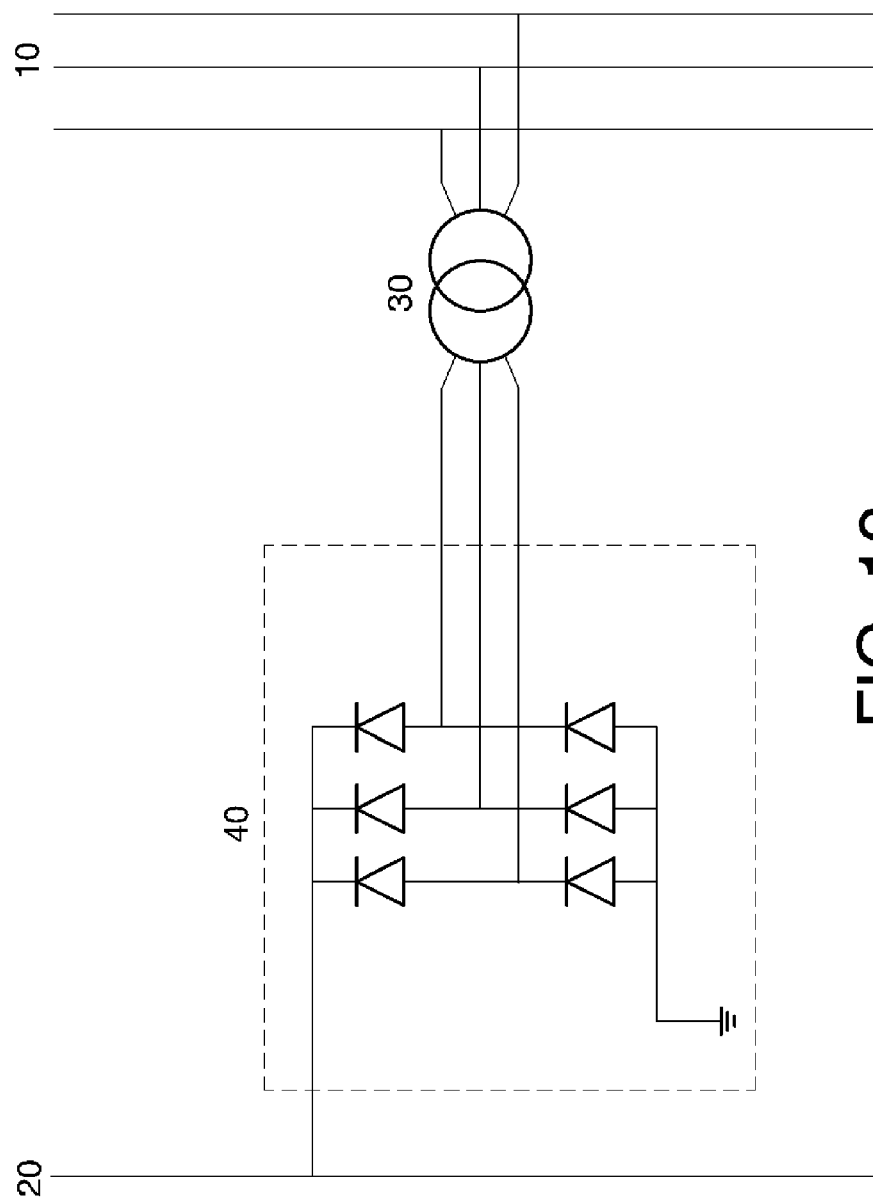
FIG. 12. Shows a schematic representation of a functional block diagram of the state of the art with elements used in the present invention.
Figure 13:
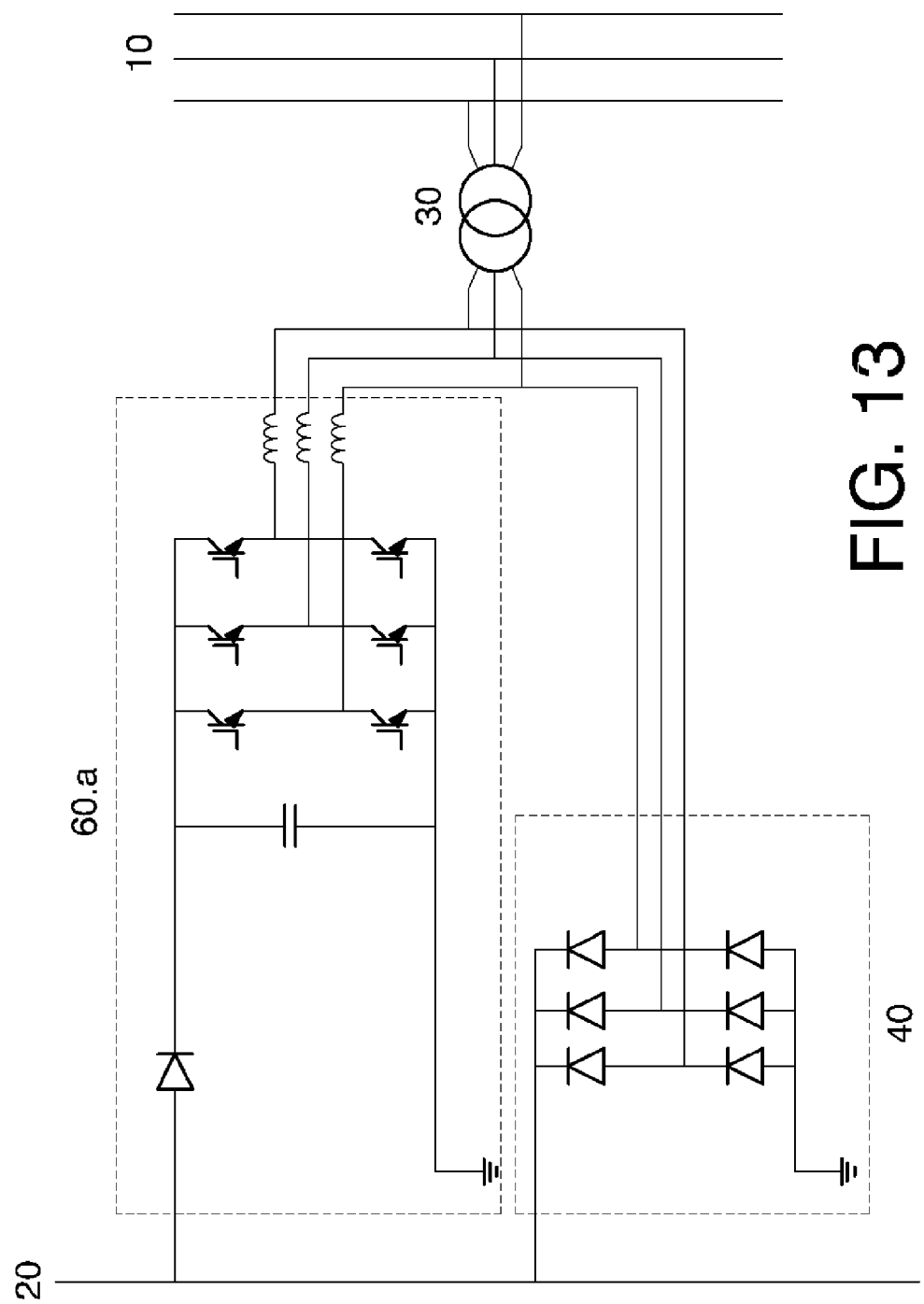
FIG. 13. Shows a functional block diagram of the state of the art of an energy recovery system in railway systems that uses a solution different from that disclosed in this invention.
Figure 14:
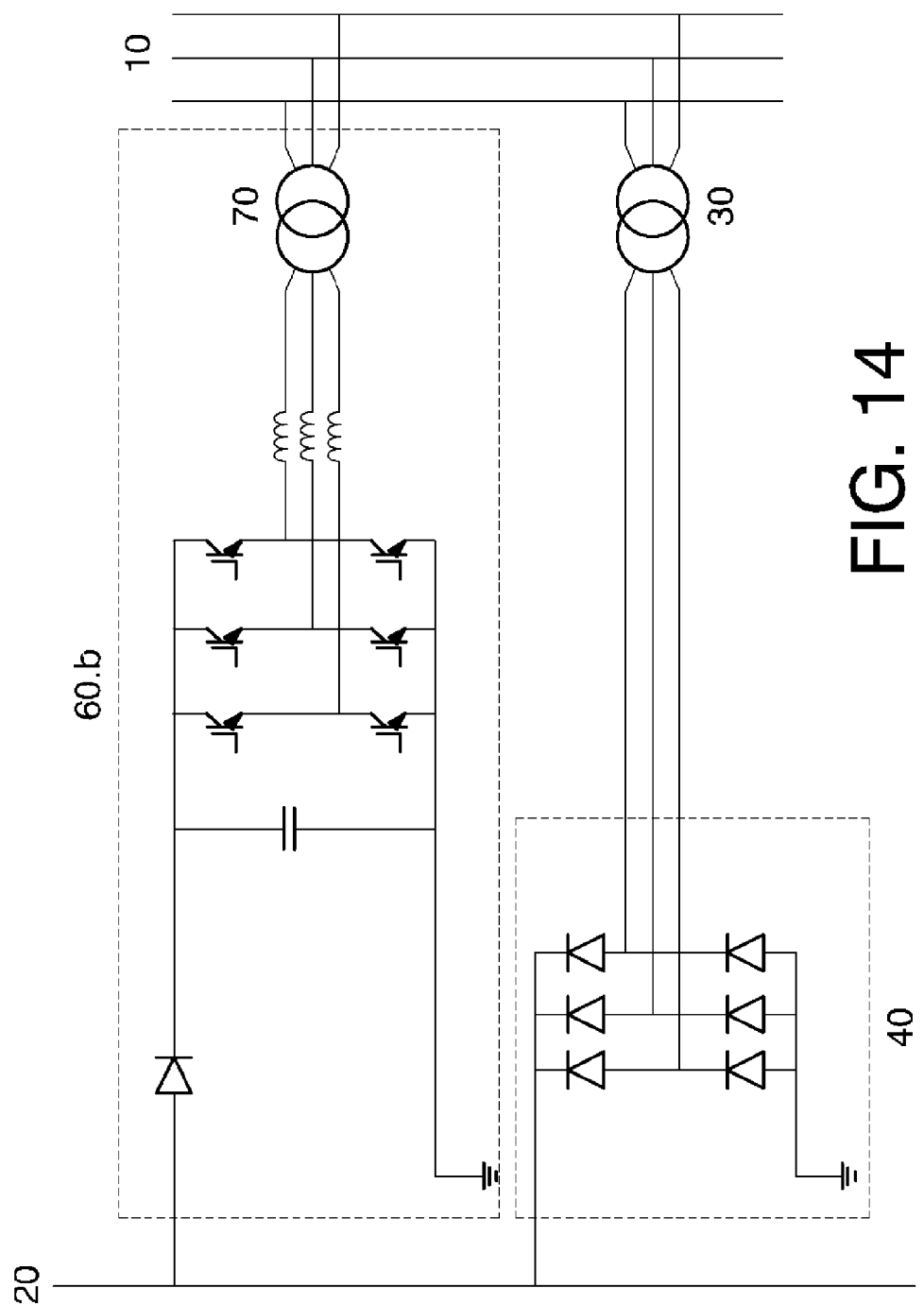
FIG. 14. Shows a functional block diagram of the state of the art with a solution different from that of the above-described FIG. 12 and from those disclosed in this invention.

FIG. 11 shows the evolution of the regulation variables in the different operating states of the system corresponding to the device 50. In the time from t0 to t1 the system in resting state, in which no train is tractioning or braking. The voltage in the catenary 20 is equal to the rectified zero-load voltage of the substation and the threshold regulation of the device 50 is calculated according to the voltage in the three-phase grid 10.

In the time from t1 to t2, a train is tractioning and the voltage in the catenary 20 falls to the value corresponding to the rectified voltage with load. The current in the device 50 is still 0, as the voltage in the catenary is lower than the threshold regulation voltage.

The rectifier bridge 40 of the substation delivers the traction current to the catenary 20.

In the time from t2 to t3, the train has stopped accelerating and consumes only a small current needed to maintain its speed, as well as for the consumption of the auxiliary converters.

At time t3 a train begins braking, raising the voltage in the catenary 20 above the zero-load voltage. At time t4 the voltage in the catenary 20 reaches the regulation threshold value and the device 50 begins to deliver power to the grid, regulating the voltage of the catenary 20.

The time from t4 to t5 shows the control strategy acting on the regulation threshold voltage for minimizing or canceling the re-circulation current between the rectifier bridge 40 and the device 50 during the energy regeneration process. At time t4 energy begins to be obtained from the catenary 20 and a re-circulation current is created. The control adjusts the regulation threshold value to the value needed to cancel this current. At time t5 the threshold voltage reaches the necessary value to eliminate the re-circulation current.

The period from t4 to t6 shows the device 50 in operation and regenerating energy. The voltage of the catenary 20 is regulated by extracting energy from it and delivering it to the three-phase grid 10 (FIG. 10 shows the evolution of the RMS value of the current delivered to the three-phase grid 10). At time t6 the train stops braking and the state of the system changes to resting again.

The invention claimed is:

1. DEVICE FOR RECOVERY OF KINETIC ENERGY IN RAILWAY SYSTEMS, wherein the railway system has a DC catenary (20) connected to a rectifier bridge block (40) that is in turn connected to the secondary winding of a transformer (30), present in the connection of the corresponding substation, the primary winding of which is connected to a three-phase AC grid (10), the device being connected between the catenary (20) and the secondary winding of the transformer (30); characterized in that the device (50) has a first DC/DC voltage raising block (51, 51*a*, 51*b*, 51*c*) that isolates from harmonics and fluctuations of the catenary, connected between the catenary (20) and an intermediate bus provided with a capacitor (53, 53') which in turn is connected with a second block for DC/AC three-phase current generation (52, 52*a*, 52*b*) joined to the secondary winding of the transformer (30); such that during the braking of the corresponding train the said first block allows raising the DC voltage of the catenary, generating a controlled voltage in the intermediate bus; while the said second block, with this controlled voltage, allows generating a high-quality three-phase current that is delivered to the three-phase grid (10) through the transformer (30).

2. DEVICE FOR RECOVERY OF KINETIC ENERGY IN RAILWAY SYSTEMS, according to claim 1, characterized in that said device (50) is undersized in power and energy with respect to the pre-existing supply system for the catenary (20) based on the rectifier bridges (40), so that the transformer (30) can support the resulting energy flow.

3. DEVICE FOR RECOVERY OF KINETIC ENERGY IN RAILWAY SYSTEMS, according to claim 1, characterized in that the said first block (51*a*) is formed by at least one branch (55) with at least three semi-conducting switches where at least the middle switch can be controlled in startup and shutdown; while the mid point defined between the upper and middle semi-conducting switches is connected through a coil to the positive terminal of the catenary (20); and the mid point defined between the lower and middle semi-conducting switches is connected through a coil to the ground or negative terminal of the catenary (20).

4. DEVICE FOR RECOVERY OF KINETIC ENERGY IN RAILWAY SYSTEMS, according to claim 3, characterized in that in the said branch (55) the upper and lower semi-conducting switches are current unidirectional switches of the diode type (58) and the middle switch is a current bidirectional switch of the IGBT type (59).

5. DEVICE FOR RECOVERY OF KINETIC ENERGY IN RAILWAY SYSTEMS, according to claim 1, characterized in that the said first block (51*b*) is formed by at least two branches (56*a* or 56*b*) with at least two semi-conducting switches each one, so that the mid point of each branch is connected through a coil to the positive terminal of the catenary (20) and the mid point of the other branch is connected through another coil to the ground or negative terminal of the catenary (20).

6. DEVICE FOR RECOVERY OF KINETIC ENERGY IN RAILWAY SYSTEMS, according to claim 5, characterized in that in the two branches (56*a*) the upper semi-conducting switch of the branch associated to the positive terminal of the catenary (20) and the lower semi-conducting switch of the branch associated to the negative terminal of the catenary (20) are current unidirectional switches of the diode type (58) and the other two semi-conducting switches are current bidirectional switches of the IGBT type (59).

7. DEVICE FOR RECOVERY OF KINETIC ENERGY IN RAILWAY SYSTEMS, according to claim 5, characterized in that in the two branches (56*b*) the two semi-conducting switches of each of the two branches are current bidirectional switches of the IGBT type (59).

8. DEVICE FOR RECOVERY OF KINETIC ENERGY IN RAILWAY SYSTEMS, according to claim 1, characterized in that the said first block (51*c*) is formed by at least one branch (57*a*) with at least four semi-conducting switches, where at least the two middle switches can be controlled in startup and shutdown; and the mid point defined between the two upper semi-conducting switches is connected through a coil to the positive terminal of the catenary (20); while the mid point defined between the two lower semi-conducting switches is connected through a coil to the negative terminal of the catenary (20).

9. DEVICE FOR RECOVERY OF KINETIC ENERGY IN RAILWAY SYSTEMS, according to claim 8, characterized in that in said branch (57*a*) the two upper and lower semi-conducting switches of the branch are current unidirectional switches of the diode type (58) and the two middle semi-conducting switches are current bidirectional switches of the IGBT type (59).

10. DEVICE FOR RECOVERY OF KINETIC ENERGY IN RAILWAY SYSTEMS, according to claim 8, characterized in that in said branch (57*b*) the four semi-conducting switches are current bidirectional switches of the IGBT type (59).

11. DEVICE FOR RECOVERY OF KINETIC ENERGY IN RAILWAY SYSTEMS, according to claim 1, characterized in that the said second block (52*a*) is formed by three branches with at least two current bidirectional semi-conducting switches (59) in each branch; such that each branch corresponds to a phase of the three-phase voltage system of the three-phase grid (10) and optionally has an inductance (60) connected between the mid point of the corresponding branch and the corresponding phase of the transformer (30); these inductances (60) not being necessary if the corresponding leak inductance of the transformer (30) is sufficiently high to ensure current regulation.

12. DEVICE FOR RECOVERY OF KINETIC ENERGY IN RAILWAY SYSTEMS, according to claim 1, characterized in that the said second block (52*b*), for high-voltage applications, is of the three-level NPC type with current unidirectional diode type semi-conducting switches (58) joined to a mid point of the intermediate bus, which limits the voltage supported by other semi-conducting switches of the IGBT type (59); in this case the intermediate bus having two capacitors (53') between which the aforementioned mid point is established.

13. DEVICE FOR RECOVERY OF KINETIC ENERGY IN RAILWAY SYSTEMS, according to claim 1, characterized in that the device (50), for power expansions with high currents, has the said first block (51) in charge of regulating the voltage of the intermediate bus sized with the number of branches needed to allow working with the corresponding current, while one or more of the said second block (52) are placed in parallel after the single DC intermediate bus.

14. DEVICE FOR RECOVERY OF KINETIC ENERGY IN RAILWAY SYSTEMS, according to claim 1, characterized in that between the catenary (20) and the DC/DC voltage raising block (51) it is possible to interconnect an optional additional block (54) formed by a diode (54*a*) with its anode connected to the positive terminal of the catenary (20) and its cathode connected to the positive terminal of the DC/DC voltage raising block (51), and by a capacitor (54*b*) connected between the cathode of said diode (54*a*) and the ground or negative terminal of the catenary (20).

15. CONTROL PROCEDURE, using the device of claim 1, for regulating the power and quality of the current delivered to the AC grid (10); characterized in that it presents the action of two coupled regulators, of which one regulates the voltage of the intermediate bus of the capacitor (53) to a specific value, controlling the current through the DC/DC voltage raising block (51), the aforementioned intermediate bus being thereby uncoupled from the variations and perturbations present in the catenary (20); while the other one regulates the power that the DC/AC three-phase current generation block (52) delivers to the grid (10) established from the voltage measured in the catenary (20) provided it exceeds a specified threshold, optimizing the dynamics of the system with a feedforward signal by which the second regulator sends to the first the value of the power delivered to the grid (10).

16. CONTROL PROCEDURE, according to claim 15, characterized in that it has a regulation performed by a control associated to the DC/DC voltage raising block (51) of a voltage of the intermediate bus of the capacitor (53) above the voltage of the catenary (20) allowing to recover energy in situations of high voltages of the grid (10) close to the catenary voltage (20), thereby optimizing the total energy recovered.

17. CONTROL PROCEDURE, according to claim 15, characterized in that a minimization is performed of the harmonic component of the current delivered by the DC/AC three-phase current generation block (52) establishing the optimum voltage value for the intermediate bus of the capacitor (53) for each voltage value of the grid (10).

18. CONTROL PROCEDURE, according to claim 15, characterized in that the current circulating through the rectifier bridge block (40) during the regeneration process is monitored and the value of the threshold voltage to regulate in the catenary (20) is adjusted so that the value of the current re-circulating between the rectifier bridge block (40) and the device (50) is minimal or zero.

* * * * *